R. W. SHARTLE.
VEHICLE SIGNAL.
APPLICATION FILED SEPT. 17, 1921.
1,425,905.
Patented Aug. 15, 1922.
2 SHEETS—SHEET 1.
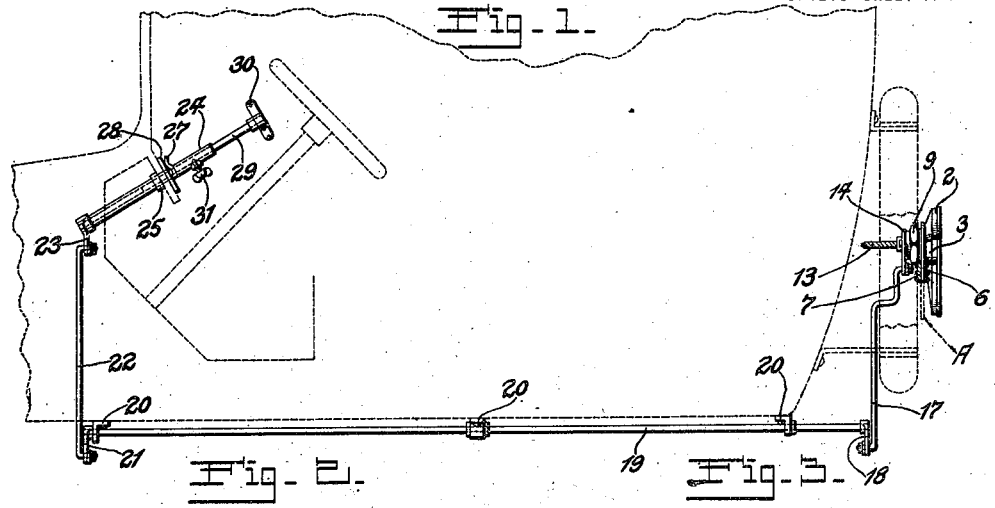
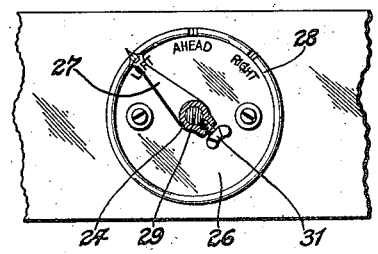
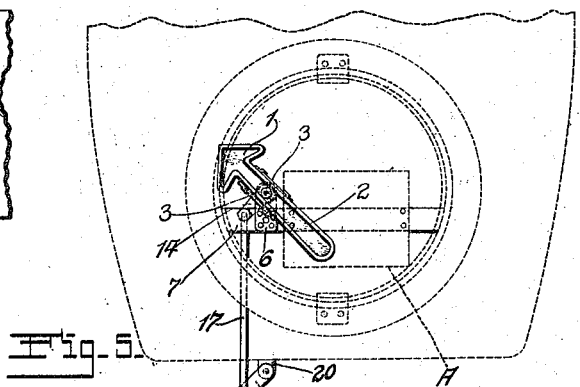
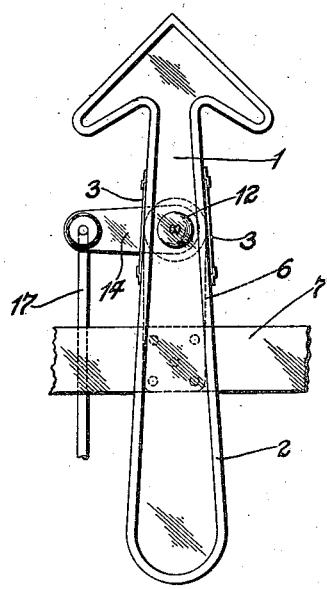
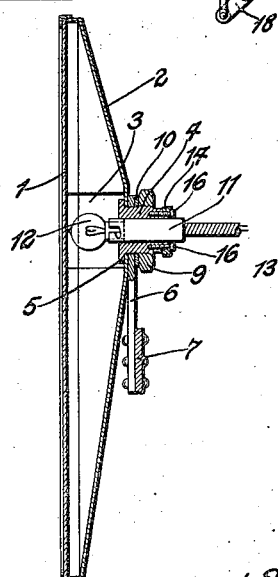
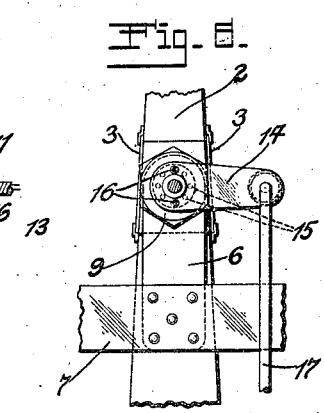
Inventor.
Ralph W. Shartle,
by Ruppey Kingsland
His Attorneys.

R. W. SHARTLE.
VEHICLE SIGNAL.
APPLICATION FILED SEPT. 17, 1921.
1,425,905.
Patented Aug. 15, 1922.
2 SHEETS—SHEET 2.
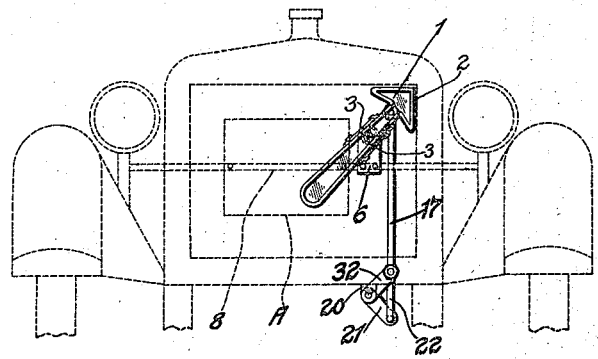
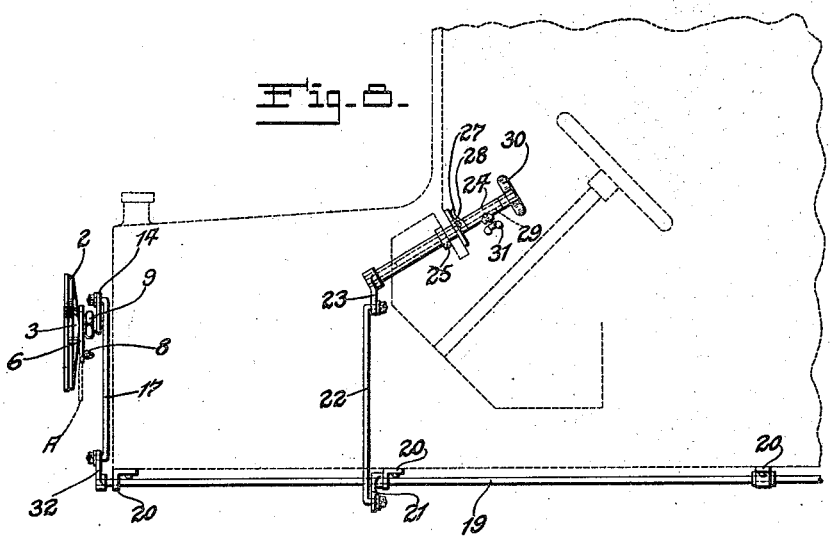
Inventor.
Ralph W. Shartle,
by Rippey-Kingsland
His Attorneys.

UNITED STATES PATENT OFFICE.

RALPH W. SHARTLE, OF ST. LOUIS, MISSOURI, ASSIGNOR TO WAYNE MANUFACTURING COMPANY, OF ST. LOUIS, MISSOURI, A CORPORATION OF MISSOURI.

VEHICLE SIGNAL.

1,425,905.  Specification of Letters Patent.  Patented Aug. 15, 1922.

Application filed September 17, 1921. Serial No. 501,223.

*To all whom it may concern:*

Be it known that I, RALPH W. SHARTLE, a citizen of the United States, residing at the city of St. Louis and State of Missouri, have invented a new and useful Vehicle Signal, of which the following is a specification.

This invention relates to vehicle signals.

An object of the invention is to provide an improved signal or indicating device for use upon an automobile or other vehicle, and including a novel and convenient operating device adapted to be operated by the operator or driver of the vehicle to indicate the direction in which the vehicle is about to turn or to indicate the fact that the vehicle is going straight ahead or is about to stop.

Another object of the invention is to provide a device of the character mentioned including a direction indicator and an illuminating device by which the indicator is illuminated at night, and which also serves as a tail light for the vehicle.

Another object of the invention is to provide a device of the character mentioned including a direction indicator located at the front of the vehicle to indicate to those approaching or meeting the vehicle the direction which the vehicle is about to take.

Another object of the invention is to provide an improved direction indicator comprising an indicating device located at the front of the vehicle and another indicating device located at the rear of the vehicle, in combination with means for operating said indicating devices simultaneously to indicate to those in front of and behind the vehicle the direction which the vehicle is about to take.

Another object of the invention is to provide a device of the character mentioned including means for illuminating the indicators at night.

Other objects will appear from the following description, reference being made to the drawings, in which—

Fig. 1 is a view showing a form of the invention in which a single indicating device is provided at one end of the vehicle, in this case at the rear.

Fig. 2 is a view showing a dial located in a position observable by the driver or operator of the vehicle to indicate the position of the indicating device which is located at one or both ends of the vehicle.

Fig. 3 is a rear elevation of the indicating device located at the rear of the vehicle.

Fig. 4 is an enlarged view of the indicating device.

Fig. 5 is a vertical sectional view.

Fig. 6 is a view showing the connections by which the indicating device is operated.

Fig. 7 is a front view showing the indicating device at the front of the vehicle.

Fig. 8 is a side elevation showing the connections for operating the indicating devices at the front and rear of the vehicle simultaneously.

In the embodiment of the invention shown the indicating device which is located at the rear of the vehicle, another of which may also be provided at the front of the vehicle if desired, comprises a pointer of proper form which may be turned to point different directions to indicate the direction to which the vehicle is about to be turned. As shown, the pointer has the general configuration of an arrow and comprises an arrow-shaped translucent panel 1 supported by and forming one wall of a case 2. For the indicator at the rear of the vehicle the panel 1 is at the rear, and for the indicator at the front of the vehicle the panel 1 is toward the front. The panel 1 is appropriately colored so that the indicating device at the rear of the vehicle will also serve as a tail light. The walls of the case 2 are inclined properly with respect to the translucent panel 1 so as to serve as a reflector for the lamp mounted in the case, and by which the indicating device is illuminated at night. The side walls of the case 2 may be formed with openings and provided with removable panels 3. The panel 3, which is toward the license plate A and which is adjacent to the lamp within the case, may be translucent so that the license plate will be illuminated by the lamp in the case which also serves to illuminate the signal. If desired both panels 3 may be removable.

The case 2 is supported upon a sleeve 4 which extends through a hole in the wall of the case and has a flange 5 upon its inner end secured to the inner surface of said wall. A supporting bracket arm 6 supports the sleeve 4 for turning movements, so that the indicating device may be turned to different positions to indicate the direction of travel of the vehicle. The supporting bracket arm 6 may be attached to any convenient part of the vehicle, as, for instance, to the cross member 7 of the tire support at the rear of the vehicle and to the lamp-connecting rod 8 at the front of the vehicle. A nut 9 threaded on the outer end of the sleeve 4, together with an interposed washer 10 preferably of elastic material, holds the indicating device in connection with the supporting arm 6, but permits the indicating device to be turned to its different adjusted positions for indicating the direction of travel of the vehicle.

A lamp socket 11 is supported within the sleeve 4. Said lamp socket extends through the sleeve and supports a lamp 12 within the case 2 in position so that the light of the lamp will be reflected to all points along the translucent panel 1 by the reflector walls 2 of the case and so that the light of the lamp will also illuminate the license plate A. The electric circuit wires 13 for the lamp extend into the socket 11 to serve the lamp in the usual way.

An arm or lever 14 is removably attached to the inner end of the sleeve 4. In order to adapt the invention for use upon various types of vehicles, it is desirable to make provision so that the lever 14 may be attached to the sleeve 4 in any one of several positions. For this purpose the end of the sleeve 4 is formed with an annular series of threaded holes 15 adapted to receive the screws 16 by which the lever may be attached to the sleeve in selected adjustments.

In the embodiment shown the end of the lever 14 is connected to the upper end of a link 17. The lower end of the link 17 is connected to an arm or lever 18 on the rear end of a rod 19 supported for rocking movements in brackets 20 supported below the vehicle body. The rod 19 extends forwardly and has an arm or lever 21 attached to its forward end and pivotally connected with a link 22 whose upper end is connected with an arm 23 attached to the forward end of a sleeve 24. The sleeve 24 is mounted for turning movements in a support 25 on the instrument board or dash of the vehicle.

The sleeve 24 also extends through a dial plate 26 having indications thereon to indicate the direction of travel of the vehicle as, for instance, the word "Ahead" to indicate that the vehicle is going straight ahead; the word "Right" to indicate that the direction of travel of the vehicle is about to be turned to the right; and the word "Left" to indicate that the direction of travel of the vehicle is about to be turned to the left. A pointer 27 in connection with the sleeve 24 operates against the rim 28 of the dial and is arranged relative to the indicating device so that when the indicating device is turned to position to indicate a direction of travel of the vehicle, the pointer is similarly arranged at the dial.

A rod 29 extends into the sleeve 24 and is provided with an operating device 30. The rod 29 may be telescoped into or out of the sleeve 24 so as to locate the operative device 30 in proper and convenient position for operation by the operator or driver of the vehicle. A set screw or clamp device 31 in the sleeve 24 serves to bind or clamp the rod 29 rigidly.

In the arrangement shown in Figs. 7 and 8 the indicating device is also supported at the front of the vehicle. The construction and arrangement of the indicating device per se is the same as the construction and arrangement of the indicating device at the rear of the vehicle as above described, the supporting arm 6 being attached to the connecting rod 9 while the link 17 at the front of the vehicle connects to an arm or lever 32 on the forward end of the rod 19, which rod in this case extends to the forward end of the vehicle. It is obvious that the indicating devices at the front and rear of the vehicle will be simultaneously operated to indicate to those approaching the vehicle from different directions the direction of travel which the vehicle is about to take.

From the foregoing it will be seen that my invention obtains all of its intended objects and purposes in a highly convenient and efficient manner. The indicating device is clearly observable by day, and at night as well. The indicating device at the rear, serving also as a tail light and as a light for illuminating the license plate, is an economical feature of the invention.

Obviously the invention may be varied in numerous particulars without departure from the nature and principle thereof. I do not limit myself therefore to unessential features.

What I claim and desire to secure by Letters Patent, is:—

1. A device of the character described, comprising a sleeve mounted for rocking movements, a case attached to one end of said sleeve, a glass plate closing the side of said case opposite said sleeve, a lamp socket extending through said sleeve into said case, a lamp supported by said socket within said case, an arm attached to said sleeve, and connections from said arm for actuating the same to turn said sleeve in either direction.

2. A device of the character described, comprising a bracket, a sleeve mounted for turning movements in said bracket, a case supported by said sleeve at one side of said bracket, a glass plate closing the side of said case opposite said sleeve, elastic means on said sleeve at the opposite side of said bracket from said case holding the sleeve in the bracket, an arm attached to said sleeve, and means for operating aid arm to turn said sleeve in either direction.

3. A device of the character described, comprising a bracket, a sleeve mounted for turning movements in said bracket, a case supported by said sleeve at one side of said bracket, a glass plate closing the side of said case opposite said sleeve, elastic means on said sleeve at the opposite side of said bracket from said case holding the sleeve in the bracket, an arm for turning said sleeve in either direction in said bracket, and means for securing said arm to aid sleeve in different selected adjusted positions.

RALPH W. SHARTLE.